United States Patent
Hass

[15] 3,683,676
[45] Aug. 15, 1972

[54] FLUIDIC LEAK DETECTOR
[72] Inventor: Hyman Hass, Stamford, Conn.
[73] Assignee: Applied Fluidics, Inc., Stamford, Conn.
[22] Filed: July 27, 1970
[21] Appl. No.: 58,236

[52] U.S. Cl. ............................................... 73/45.1
[51] Int. Cl. ........................................... G01m 3/32
[58] Field of Search ................ 73/45.1, 41, 37, 49.2

[56] References Cited

UNITED STATES PATENTS

| | | | |
|---|---|---|---|
| 3,135,575 | 6/1964 | Breidenbach et al. | 73/45.1 X |
| 3,489,275 | 1/1970 | Powers, Jr. | 73/37 X |
| 3,462,014 | 8/1969 | Kallevig et al. | 209/72 |
| 3,374,887 | 3/1968 | Paruolo | 73/37 X |
| 3,426,582 | 2/1969 | McArthur et al. | 73/45.1 |
| 3,564,902 | 2/1971 | Heitmann | 73/37 |

Primary Examiner—Louis R. Prince
Assistant Examiner—William A. Henry, II
Attorney—Michael Ebert

[57] ABSTRACT

A fluidic detector for testing bottles for leaks. The detector includes a test station having a sensor adapted to signal the presence of a bottle at the test position, the signal activating a control circuit which initiates the operation of a retractable pressure-sensing head. The head sealably engages the bottle and proceeds to fill it with a compressible fluid, the resultant pressure build-up in the bottle being monitored and applied to a fluidic comparator where the variable pressure is compared with reference values to determine whether the bottle is acceptable, and in the event there is a leak which renders the bottle unacceptable, to produce a reject signal which, after the head is disengaged from the bottle, is applied to an ejector to remove the defective bottle.

4 Claims, 4 Drawing Figures

INVENTOR.
HYMAN HASS
BY
ATTORNEY

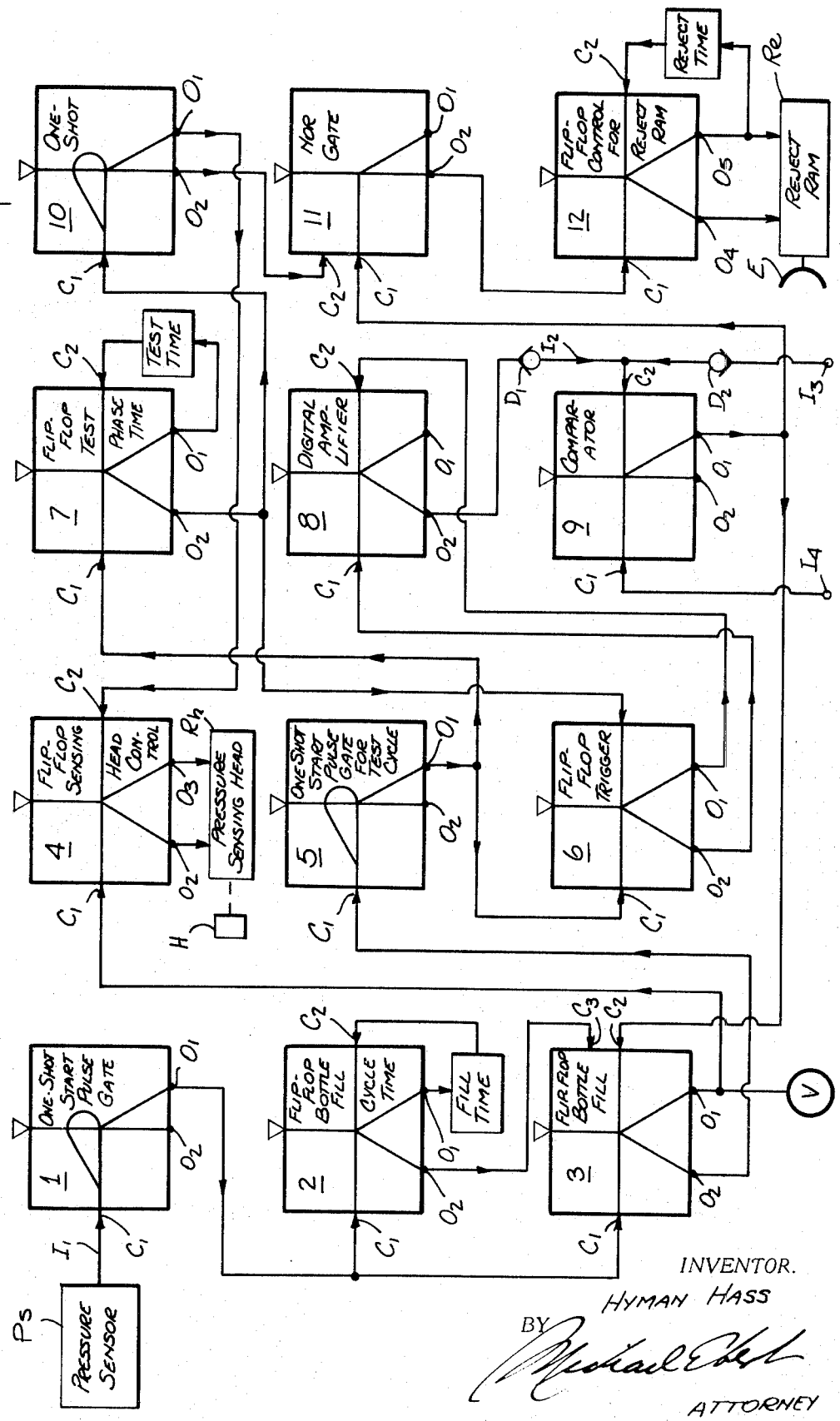

3,683,676

FLUIDIC LEAK DETECTOR

BACKGROUND OF THE INVENTION

This invention relates generally to the testing of bottles and the like for leaks, and more particularly to a fluidic leak detector adapted to subject a bottle under test to fluidic pressure to determine whether it is capable of retaining such pressure.

For many years, beverages and other food products were dispensed in returnable bottles whereby the consumer would return the bottle to the seller for refilling and reuse. Since bottles of this type were intended for repeated cleaning, refilling and handling and were subject to heavy use, they were fabricated with great care to assure freedom from defects.

But in recent years, the market practice has veered toward inexpensive, non-returnable or one-shot containers to be discarded after a single use. Such disposable bottles are mass-produced by high-speed, fully automated machinery. Inevitably some bottles produced in this fashion develop defects and it is necessary therefore to provide an inspection procedure capable of keeping up with the machine output without adding materially to the cost of production.

Existing inspection procedures are slow and relatively expensive, and while suitable for the production of the more costly returnable bottles, they are not compatible with the requirements for disposable bottles. For example, apart from direct visual inspection of the glass bottle, the simplest way to determine whether a bottle will leak is to first cap the bottle and then immerse it in water. Should there be a leak, this will be made evident by air bubbles appearing in the water as a result of the displacement of the air in the bottle by water. But one can ill afford to subject non-returnable bottles to a time-consuming, manual air-bubble test procedure.

Elaborate electrical testing systems have been devised to test bottles for leakage. But such systems which serve to sense fluid conductivity through the bottle or to measure fluid pressure therein by electrical transducers require equipment which is expensive as well as difficult to calibrate and maintain. Moreover, electrical systems are often objectionable in certain industrial environments for they may constitute a hazard or be subject to contamination.

SUMMARY OF THE INVENTION

In view of the foregoing, it is the main object of this invention to provide a fluidic leak detector capable of automatically testing bottles and other fluid containers at high speed.

Because the detector is entirely fluidic in character, it is suitable for many industrial environments in which electrical equipment is objectionable, the fluidic detector being reliable and efficient in operation.

More specifically, it is an object of the invention to provide a fluidic leak detector for inspecting bottles on a conveyor line passing through a test station, the detector acting to determine whether the bottle at the station is sound or leaky and, if sound, to continue the bottle on the line and, if leaky, to eject the bottle from the line.

Also an object of the invention is to provide an automatic fluid leak detector which is fast-acting and capable of testing bottles at a rate commensurate with a high-speed production output, the detector being relatively inexpensive to manufacture and install on an existing production line.

A significant aspect of the invention is that the detector is capable of discriminating between minute leaks, which do not render the bottle unacceptable, and minor or gross leaks, which do, so that bottles which are flawless as well as those which are only very slightly imperfect are accepted.

Briefly stated, these objects are attained in a leak detector which includes a fluidic sensor which produces a signal indicating that the bottle conveyed to the test station is in a position to be tested. The fluidic signal initiates the operation of a pressure-sensing head that sealably engages the bottle and proceeds to fill it with a compressible fluid. As the bottle is being filled, the internal fluid pressure thereof is monitored in a fluidic logic circuit and compared with a first reference or pre-set pressure during a filling phase.

When the pressure within the bottle reaches the level of the pre-set pressure, the filling action is terminated. However, due to the inherent inertia in the fluidic system, the internal bottle pressure continues to rise beyond the reference level until a peak value is attained. From the peak value, the internal pressure proceeds to decay when a leak is present, the decay rate depending on the size of the leak. Simultaneously with the termination of the filling phase, a timed test phase is initiated, during which a new reference or test pressure is applied which is compared with the internal pressure. When the test phase is completed, a control circuit checks the state of the comparator, and if the bottle pressure remains above the test level because the bottle is free of leaks or has only a very slight leak, the bottle is considered acceptable, but if the internal pressure falls below the test reference level, and is therefore not acceptable, an appropriate reject mechanism is activated.

OUTLINE OF THE DRAWING

For a better understanding of the invention as well as other objects and further features thereof, reference is made to the following detailed description to be read in conjunction with the accompanying drawing, wherein:

FIG. 3 is a schematic diagram of the logic circuit associated with the test mechanism according to the invention.

DESCRIPTION OF THE INVENTION

The present invention makes use of fluidic devices to carry out control functions to detect the presence of a leak in a bottle and to reject a defective bottle. The fluidic elements incorporated in the invention are known per se and will therefore not be described in detail.

Fluidic devices are available which are capable of performing the same functions as electronic devices. As pointed out in the article "Fluidics — a new control tool", appearing in the November 1969 issue of SPEC- TRUM (IEEE), fluidic elements can operate reliably in environments where electronic circuits are prohibited, and in certain applications fluid logic circuits can perform control functions similar to electronic circuits, with a saving in cost and an increase in reliability. As disclosed in this article, fluidic devices exist which are adapted to function as amplifiers, gates, multivibrators, comparators, sensors, AND, NOR and OR circuits, and to carry out many other functions equivalent to those afforded by electronic devices.

Figure 1:
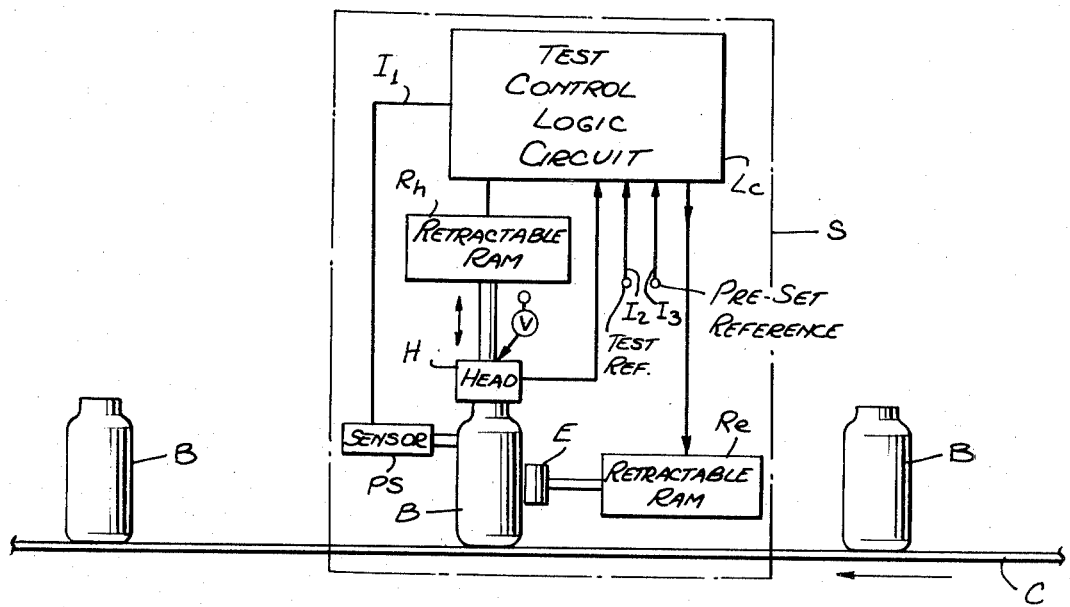
FIG. 1 is a schematic diagram of a fluidic leakage detector in accordance with the invention.

Referring now to FIG. 1, a leak detector in accordance with the invention is adapted to test bottles B which advance sequentially toward a test station, generally designated by letter S. At this station, the bottle under test is pressurized to determine whether the bottle will contain the fluid and, if not, the bottle is pushed off the conveyor C so that the output of the station yields bottles, all of which are reasonably leak-proof and have passed he test. Thus conveyor C transmits to the test station the entire output of bottle-producing means, the test station acting to discriminate between good and bad bottles and passing on only those which are acceptable. The discrimination is not as between perfect bottles and those having any degree of leakage, but is as between those bottles whose leakage is so small as to be insignificant and those bottles whose degree of leakage renders them unacceptable.

Located at the test station is a bottle test machine constituted by a fluidic pressure-sensor PS, a pressure-sensing head H, a fluid-operated retractable Ram $R_h$ coupled to the head to bring the head into and out of engagement with the mouth of the bottle best tested, an ejector arm E for engaging the bottle to push it off the conveyor, and a fluid-operated ram $R_e$ for driving the ejector arm. The bottle test mechanism is controlled by a logic circuit, generally designated by letters LC, which governs the sequence of steps involved in the test procedure.

Figure 2:
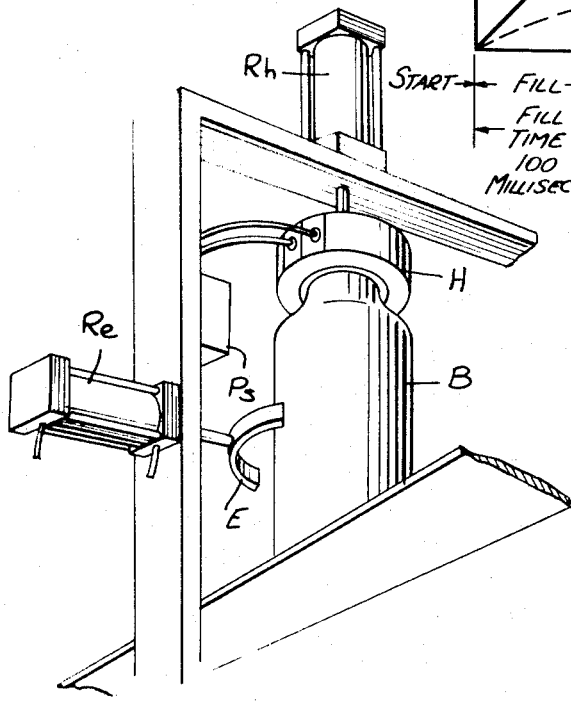
FIG. 2 illustrates in perspective the bottle test mechanism at the test station.

The first function of the bottle test mechanism is to signal the logic circuit LC that a bottle B has advanced to the test position at the station S. This is accomplished, as best seen in FIG. 2, by sensor PS which engages the bottle when it is at the proper test position. This sensor may be any existing form of fluidic sensor such as a back-pressure sensor, a "fluidic ear", or any of the fluidic sensors shown in the above-cited article in SPECTRUM. The fluidic "presence" signal $I_1$ is applied to logic circuit LC which then proceeds to activate fluidic ram $R_h$ to cause pressure-sensing head H to engage the mouth of bottle B being tested. The ram may be a device similar to a hydraulic ram in which a piston slidable within a cylinder is caused to shift position in a direction depending on whether fluid pressure is applied in front of or behind the piston.

When pressure-sensing head H is in engagement with bottle B, it seals the bottle, and a compressible fluid, which may be air or an inert gas such as nitrogen, is then admitted through a valve V into the bottle to fill same and to raise the internal pressure thereof. This internal pressure $I_4$ is monitored in logic circuit LC through a sensing line. Logic circuit LC includes a fluidic comparator which acts to compare the variable pressure level with a pre-set reference or pre-set pressure $I_3$ level.

When internal bottle pressure $I_4$ reaches the level of pre-set pressure $I_3$, the filling action is terminated by closing Valve V. However, due to the inherent inertia of the fluidic system, the internal bottle pressure $I_4$ continues to rise above the pre-set level established by $I_3$ until a peak value is attained, unless the bottle has a gross leak, in which event the pressure will never rise to the reference level.

From the peak value, internal pressure $I_4$ will proceed to decay in the event a leak is present at a rate determined by the nature of the leak. Thus a minute leak will result in a very slow rate of decay, and larger leaks in more pronounced rates. Simultaneously with the termination of the filling phase, a timed test phase is initiated during which a new reference or test pressure $I_2$ is applied to the logic circuit. When the timing phase is completed, the logic circuit checks the state of the comparator and, if the internal pressure $I_4$ remains above test level $I_2$ because the bottle is without a leak or has only a very slight leak, the bottle is considered acceptable. But if internal pressure $I_4$ has decayed below the test level $I_2$, eject ram $R_e$ is activated to reject the leaky bottle.

Figure 4:
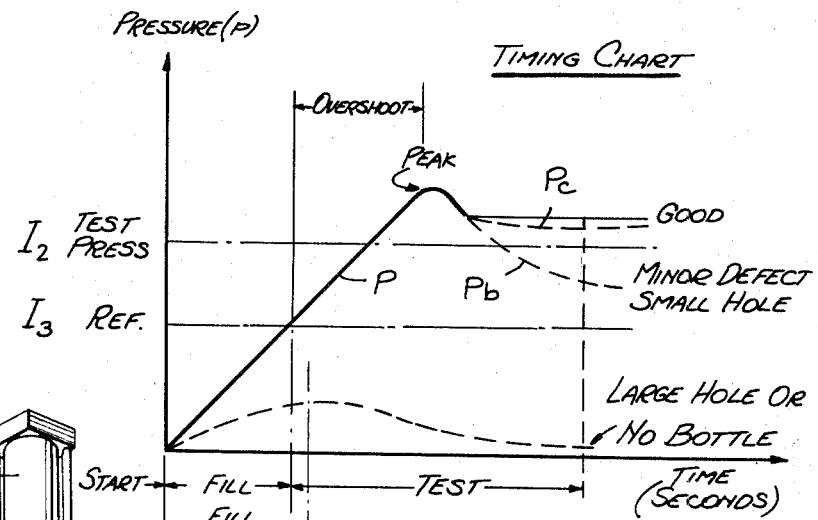
FIG. 4 is a chart illustrative of the operating pressures involved in the detector.

Referring now to FIGS. 3 and 4, logic circuit LC is shown in block diagram form. The operation of this circuit is initiated by a fluidic signal $I_1$, obtained from pressure-sensor PS indicating the presence of a bottle to be tested. Signal $I_1$ is applied to port $C_1$ of a one-shot fluidic multivibrator 1, having outputs $O_1$ and $O_2$. An output is yielded at $O_1$ in response to signal $I_1$, the output otherwise going to output $O_2$ of device 1.

Multivibrator 1 sends through output $O_1$ a conditioned start signal to the port $C_1$ of flip-flop device 2 and port $C_1$ of flip-flop device 3. Device 2 is a timing gate and device 3 is a bottle-filling gate. The start signal applied to gate 3 turns on output $O_1$ thereof which opens the bottle-filling valve V. The output $O_1$ of gate 3 is also applied to port $C_1$ of a flip-flop device 4 which controls the operation of sensing-head ram $R_h$. When the output $O_1$ of gate 3 is applied to port $C_1$ of gate 4, output $O_3$ of gate 4 is rendered operative to effect an advance of ram $R_h$ to cause the ram sealably to engage the bottle. In the absence of an input to port $C_1$ of gate 4, output $O_2$ is operative to effect retraction of ram $R_h$.

Thus signal $i_1$ produced by sensor PS causes valve V to open. The bottle under test is engaged by head H and as the bottle is filled, a signal $I_4$ is produced representing the internal pressure in the bottle.

Comparator 9 of the logic circuit includes an input port $C_1$ to which is applied bottle pressure $I_4$ and an input port $C_2$ to which is applied, by way of a diode or check valve $D_2$, a pre-set reference pressure $I_3$. As soon as $I_4$ exceeds $I_3$, comparator 9 switches its fluidic output from output $O_2$ to $O_1$. The fluidic signal from output $O_1$ of comparator 9 is applied to port $C_2$ of gate 2 to reset this gate, causing it to switch from output $O_1$ to output $O_2$, thereby cutting off valve V and terminating the filling phase. The signal at output $O_2$ of gate 3 is applied to port $C_1$ of gate 5, which is a one-shot multivibrator serving to initiate a test phase to be later described.

At this point, it is desirable to review the timed sequence of events as set forth in the timing chart in FIG. 4 where the internal pressure developed in the bottle under test is plotted against time. It will be seen that when the bottle proceeds to be filled with fluid during the test phase, the internal pressure, as represented by curve P, rises during a fill period to a level at which it intersects the level of the preset reference pressure $I_3$. However, this happens only if the bottle is perfect or if the leak therein is relatively minor. But for gross defects (or in the absence of a bottle at the station), the internal pressure will not rise.

To prevent a hang-up of the test cycle, gate 2, which is a flip-flop device, includes a timing network between its input port $C_2$ and its output $O_1$ such that after a predetermined period following the application of a start signal to input port $C_1$, the output switches to output $O_2$ which applies a fluidic signal to input port $C_3$ of gate 3 to cut off valve V. Gate 2 therefore serves as a timer, the period thereof being set so that the fill time controlled thereby is slightly longer than the time required to fill the bottle to exceed pre-set level $I_3$. This is made evident in FIG. 4, where time $T_1$ is the time required for pressure P to intersect pre-set level $I_3$, and time $T_2$, which is slightly longer, is the fill time provided by timing gate 3.

Thus if bottle pressure $I_4$ does not attain the pre-set reference level $I_3$ before the fill time $T_1$ is expired, valve control gate 3 will switch from output $O_1$ to $O_2$ to cut off the filling valve V and start the test phase.

Let us now consider the status of the system at this juncture. Gate 4, whose output $O_3$ is operative, acts to maintain head H in engagement with the bottle under test. Output $O_1$ of gate 3, which controls valve V, has been turned off, either because pressure $I_4$ is greater than $I_3$, causing comparator 9 to signal gate 3 at port $C_2$, or because the fill time has elapsed and timer gate 2 has so signalled gate 3 at port $C_3$. However, after the filling phase, bottle pressure continues to rise to a peak well over pre-set reference value $I_3$, as shown by the time profile in FIG. 4. The reason for this rise is the fluidic time lag of the system and fluid momentum or inertia. With an acceptable bottle, this overshoot will be predictable and repeatable with each succeeding acceptable bottle. But with a leak, this peak may or may not be repeated.

We have now progressed to the point where bottle-fill control gate 3 has been reset to produce a fluidic signal in output $O_2$ thereof, which goes to port $C_1$ of gate 5. Gate 5 is a one-shot multivibrator which produces a conditioned pulse at its output $O_1$ which initiates a test phase by signalling gates 6 and 7.

Gate 6 is a flip-flop device that triggers gate 8 which acts as a digital amplifier to turn on a test reference pressure $I_2$. The combination of gates 6 and 8 forms a type of fluidic valve, which applies test pressure to port $C_2$ of comparator 9 through diode $D_1$. Therefore, when gate 6 is signalled at its port $C_1$ to produce an output at $O_1$, this output is applied to port $C_2$ of gate 8, producing an output at $O_2$ which puts test pressure $I_2$ at diode $D_1$. The diodes $D_1$ and $D_2$ determine the pressure applied at port $C_2$ of comparator 9. When test reference pressure $I_2$, applied through diode $D_1$, exceeds the level of pre-set reference pressure $I_3$ applied through diode $D_2$, then pressure $I_2$ will be effective for comparison with the internal bottle pressure $I_4$.

It is to be noted that if one were to wait for a small leak to discharge the bottle from its peak value back to the pre-set reference pressure $I_3$, a considerable length of time would elapse, making the cycle time extremely slow. By introducing a test reference pressure $I_2$ at a level higher than pre-set pressure $I_3$, it is no longer necessary to wait so long before a leak is discovered, thereby making possible a drastic reduction in cycle time. Thus the function of gates 6 and 8 is to create a test reference pressure in the test phase following the filling phase.

During the test phase, bottle pressure $I_4$ is compared to test pressure $I_2$. If bottle pressure $I_4$ falls below the peak level and then remains at a plateau as shown in FIG. 4, then the bottle is free of leaks, and no decay in pressure will be encountered during the test phase. If bottle pressure $I_4$ never reaches even the level of the pre-set reference pressure $I_3$ as indicated by dotted curve P, this reflects a large hole, and the bottle is grossly defective. But if the bottle under test has only a small leak, this minor defect does not prevent bottle pressure $I_4$ from going above the level of $I_3$ in the filling phase. However, in the test phase, because of the minor defect, the bottle pressure will decay below the test level $I_2$, as indicated by curve $P_b$. On the other hand, if the defect is so minute as to cause bottle pressure $I_4$ to decay very sightly, the level of $I_4$, as indicated by curve $P_c$, will still be above test level $I_2$.

If, therefore, the bottle is acceptable as indicated by the fact that bottle pressure $I_3$ remains above test level $I_2$ in the test phase, the output $O_1$ of comparator 9 will be turned off only if bottle pressure $I_4$ falls below test pressure at port $C_2$.

Considering again the fluidic pulses from output $O_1$ of gate 5, at the time it triggers gate 6, it also signals gate 7 at its port $C_1$. Gate 7 is a flip-flop device having a timing circuit between output $O_1$ and port $C_2$. The test time afforded by gate 7 determines the criteria for bottle acceptability. If bottle pressure $I_4$ is greater than test pressure $I_2$ when the test time runs out, the bottle is considered to be substantially free of leaks.

When, at the end of the test phase time, the output of gate 7 switches to output $O_2$, this output applies a fluidic signal to port $C_1$ of gate 10 which is a one-shot multivibrator that is caused to switch its output from output $O_2$ to output $O_1$ for a brief interval (i.e., 10 milliseconds). Output $O_2$ of gate 10 applies a fluidic signal to port $C_2$ of a NOR gate 11, whereas output $O_1$ of gate 10 applies a fluidic signal to port $C_2$ of gate 4.

If, during the 10 milliseconds during which there is no signal at port $C_2$ of NOR gate 11 from output $O_2$ of gate 10, there is also no signal from output $O_1$ of comparator 9 applied to port $C_1$ of NOR gate 11, this gate will be activated during that 10-millisecond interval, producing an output at output $O_2$ of NOR gate 11 which will be applied to port $C_1$ of flip-flop gate 12, causing gate 12 to produce an output at its output $O_4$ to operate the reject ram $R_e$.

The only instance in which there is no signal present at both ports $C_1$ and $C_2$ or NOR gate 11, is when the bottle pressure $I_4$ is less than test pressure $I_2$ during the 10-millisecond interval. This occurs only when bottle pressure decays faster than the acceptable rate, which means the bottle leaks.

With the completion of the test phase, output $O_2$ of gate 7 applied to port $C_2$ of gate 6 resets gate 6 and hence gate 8. The output $O_1$ of gate 10 applied to port $C_2$ of gate 4 causes the output of this gate to switch to output $O_2$, causing the ram head H to retract. All gates have therefore returned to their starting position. If a bad bottle has been detected, a pulse has gone from output $O_2$ of gate 11 to port $C_1$ of gate 12 which serves to time the duration of the reject ram $R_e$.

While there has been shown and described a preferred embodiment of a fluidic leak detector in accordance with the present invention, it will be understood that many changes and modifications may be made therein without departing from the essential spirit of the invention.

I claim:

1. A fluidic detector for testing bottles for leaks, said detector comprising:
    A. a sensor adapted to produce a start signal indicative of the presence of a bottle at a test position;
    B. a retractable head responsive to said start signal to engage the mouth of the bottle and to supply a fluid thereto for a predetermined period, causing the internal pressure of the bottle to rise to an extent determined by its condition, the level of internal pressure thereafter decaying in a defective bottle having a leak;
    C. a fluidic logic circuit responsive to the internal pressure in said bottle and adapted to compare the level thereof with reference values to determine whether the bottle is acceptable and, in the event there is a decaying level as a result of a leak which renders the bottle defective, to produce a reject signal, said logic circuit including a comparator to compare the level of the internal pressure with a pre-set reference value to determine whether this level rises above the pre-set value during a bottle-filling phase, and to compare the level of internal pressure with a test reference value to determine whether the level decays below said test value during a subsequent test phase, said reject signal being produced in the event the level fails to rise above the pre-set value or decays below the test value; and
    D. means responsive to said reject signal to eject the defective bottle after the head is retracted.

2. A fluidic detector as set forth in claim 1, wherein said retractable head is operated by a fluidic ram which is caused to extend the head when said start signal is received.

3. A fluidic detector as set forth in claim 1, wherein said means to eject the bottle is constituted by an ejector arm operated by a fluidic ram.

4. A fluidic detector as set forth in claim 3 wherein said comparator includes a first input port to which said internal pressure is applied, and a second input port to which said pre-set reference value and said test value are both applied through respective diodes.

* * * * *